United States Patent [19]
Neri et al.

[11] Patent Number: 5,521,498
[45] Date of Patent: May 28, 1996

[54] DEVICE FOR SENSING THE THICKNESS OF STRIP MATERIAL IN PARTICULAR IN DEVICES FOR CHANGING ROLLS OF METALLIZED STRIP MATERIAL AUTOMATICALLY

[75] Inventors: Armando Neri; Bruno Tommasini, both of Bologna, Italy

[73] Assignee: G.D S.p.A., Bologna, Italy

[21] Appl. No.: 77,717

[22] Filed: Jun. 17, 1993

[30] Foreign Application Priority Data

Jun. 17, 1992 [IT] Italy .................... BO92A0246

[51] Int. Cl.$^6$ ................. G01B 7/06; G01R 33/12
[52] U.S. Cl. ........................ 324/229; 324/230
[58] Field of Search ............. 324/229, 230, 324/236, 207.16, 207.26, 656, 707, 708, 713

[56] References Cited

U.S. PATENT DOCUMENTS

| | | | |
|---|---|---|---|
| 3,205,352 | 9/1965 | Prucha | 324/236 |
| 3,544,893 | 8/1968 | Savin et al. | 324/708 |
| 3,679,968 | 7/1972 | Cammercon et al. | 324/34 TK |
| 3,878,457 | 4/1975 | Rodgers | 324/229 |
| 4,005,359 | 1/1977 | Smoot | 324/34 TK |
| 4,333,052 | 6/1982 | Schmall | 324/236 |
| 4,674,697 | 6/1987 | Filter et al. | 242/58.1 |
| 4,682,038 | 7/1987 | Focke | 250/548 |
| 4,791,367 | 12/1988 | Typpo | 324/236 |
| 4,901,577 | 2/1990 | Roberts | 73/600 |
| 5,012,206 | 4/1991 | Tigges | 324/236 |
| 5,132,617 | 7/1992 | Leach et al. | 324/229 |

FOREIGN PATENT DOCUMENTS

| | | | |
|---|---|---|---|
| 0142129 | 5/1985 | European Pat. Off. | B65B 57/02 |
| 0299716 | 1/1989 | European Pat. Off. | G01B 7/10 |
| 0442727 | 8/1991 | European Pat. Off. | G01B 7/06 |
| 3639972 | 5/1988 | Germany | B65H 7/00 |
| 148957 | 12/1989 | Japan | 324/236 |
| 1148956 | 12/1989 | Japan | 324/236 |

*Primary Examiner*—Sandra L. O'Shea
*Assistant Examiner*—Roger Phillips
*Attorney, Agent, or Firm*—Cushman Darby & Cushman

[57] ABSTRACT

Rolls of metallized strip material are changed automatically at a station incorporating a device by which the thickness of the strip material is sensed utilizing a resonant circuit driven at a frequency other than its own resonant frequency and consisting in a coil with a toroidal core affording an opening or gap through which the running strip material is directed; a voltage sensor connected to the terminals of the coil pilots the operation of two switched outputs by way of respective comparators such as can be preset and activated parametrically in response to selected voltage values registering at the terminals of the coil with variations in inductive reactance determined by and indicating the thickness and the electrical and physical properties of the passing strip.

2 Claims, 2 Drawing Sheets

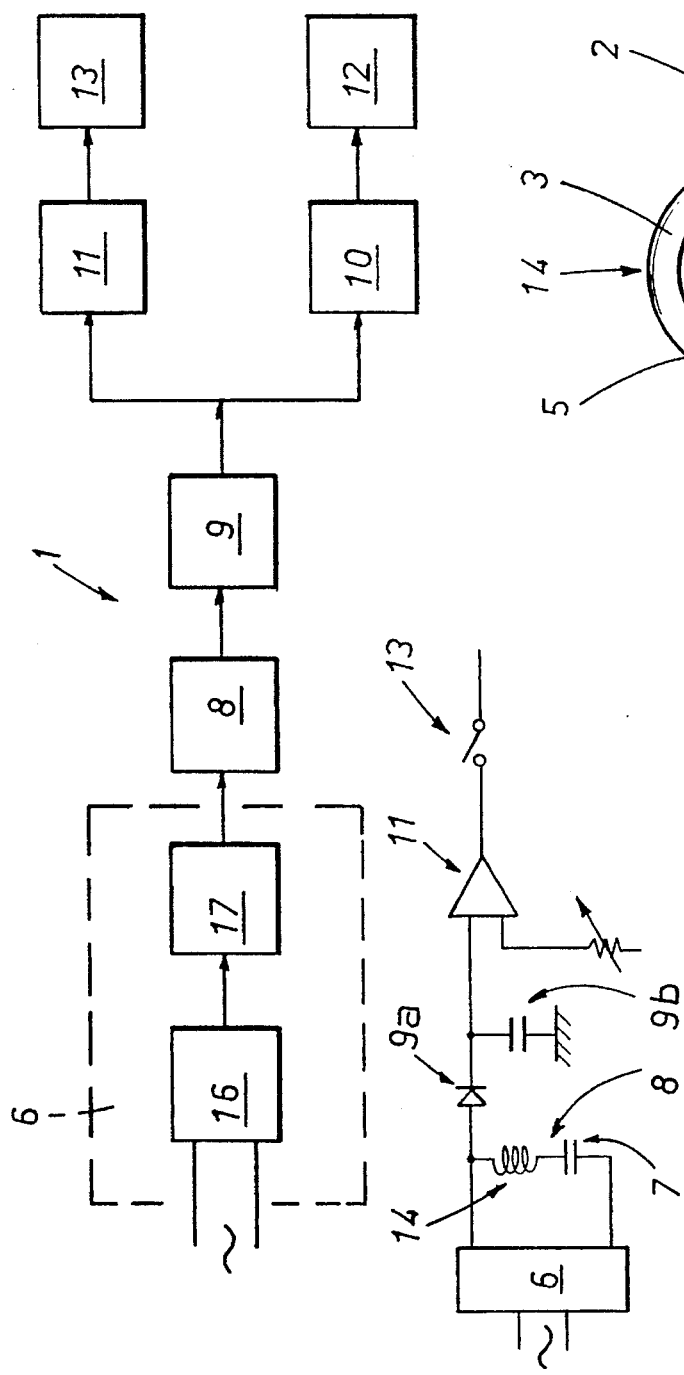
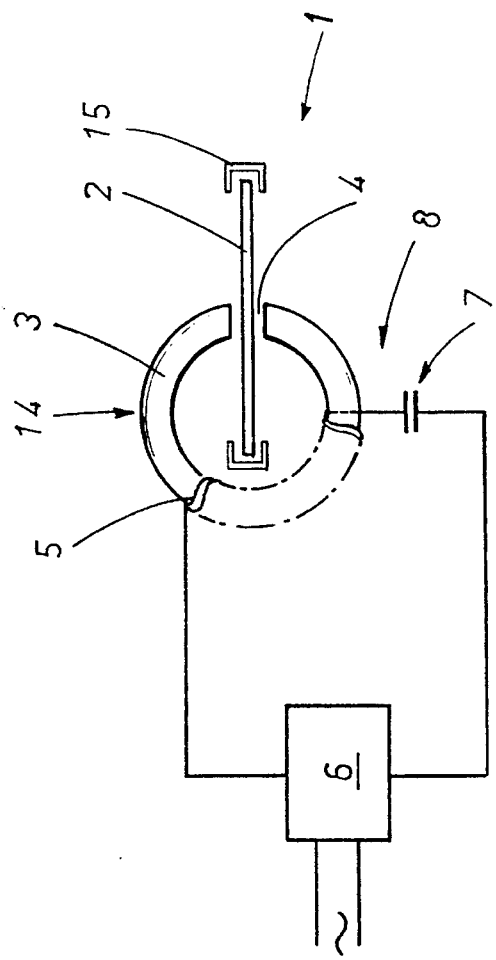
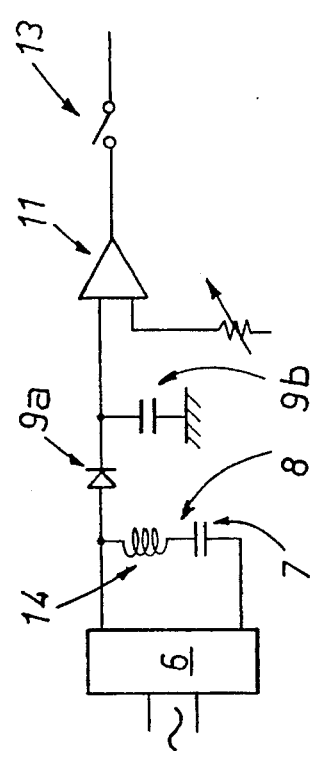
FIG 1
FIG 2a
FIG 2b

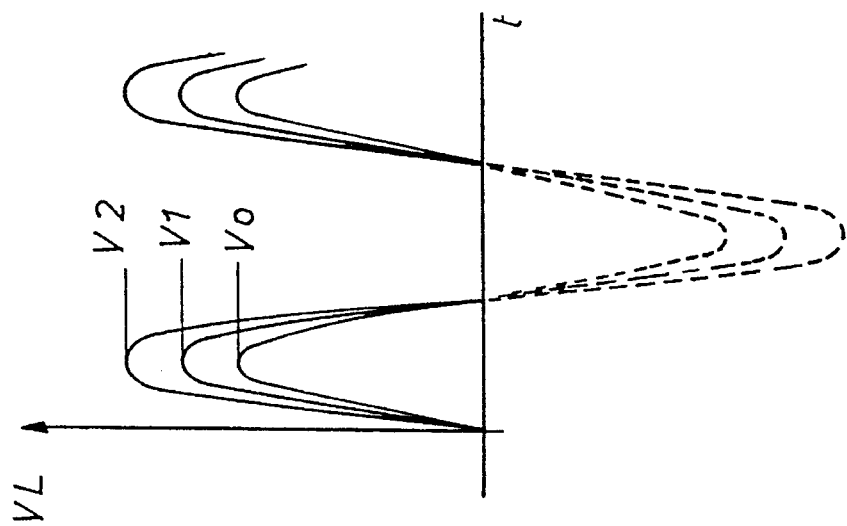
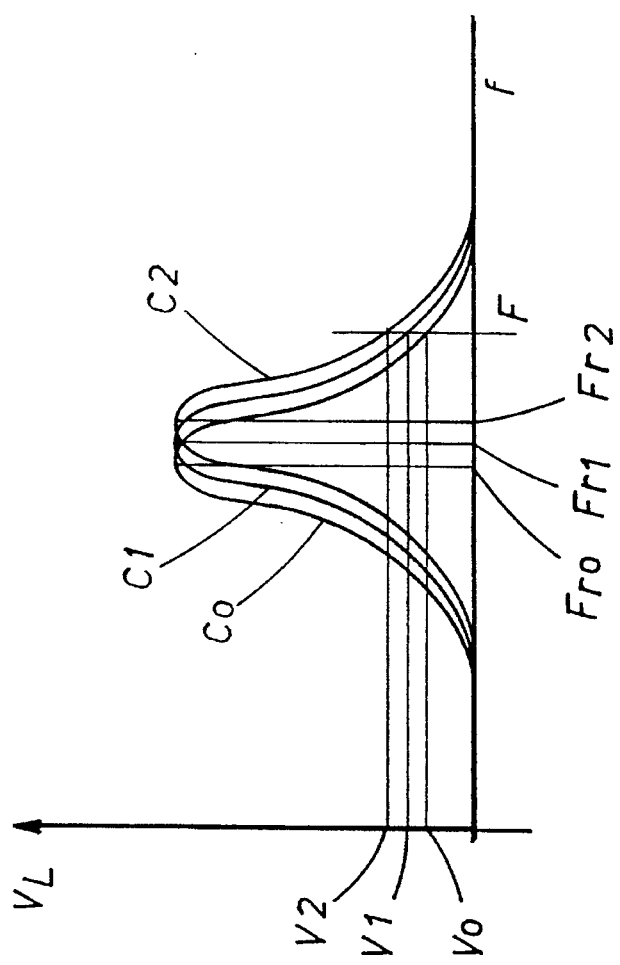

DEVICE FOR SENSING THE THICKNESS OF STRIP MATERIAL IN PARTICULAR IN DEVICES FOR CHANGING ROLLS OF METALLIZED STRIP MATERIAL AUTOMATICALLY

BACKGROUND OF THE INVENTION

The present invention relates to a device used which to sense the thickness of strip material in an apparatus for changing rolls of metallized strip material automatically.

In particular, the present invention relates to a sensing device designed to detect the thickness of a strip material consisting at least in part of a diamagnetic material, which is a paper based strip material having at least one face is coated with a metallic film having diamagnetic properties, i.e., having a relative magnetic permeability less than unity. More exactly, such a device is utilized to identify stretches of metallized strip material exhibiting a thickness approximately double the normal thickness. Such a requirement arises where two successive strips are joined together to ensure a continuous infeed of material.

In the field of automatic devices for changing rolls of strip material, considerable importance attaches to a facility allowing automatic detection of the joint between the trailing end of a depleting roll of strip and the leading end of a replacement roll. More specifically, in the majority of applications, it is necessary to discard the portion of joined strip that becomes doubled in thickness as a result of the overlap between the leading and trailing ends. The current method of identifying the joint between two strips is to utilize optical sensors consisting in an emitter element, by which a beam of light is generated and directed at the strip, and a receiver element capable of measuring the intensity of the light penetrating the strip. Given the intensity of the light measured by the optical sensors and the nature of the strip material, it becomes possible to determine when a stretch of double thickness passes between the emitter and receiver elements. Sensors of this type are effective only for certain types of material, however, and in particular, for materials of appreciable transparency. These sensores tend to be substantially ineffective with opaque materials, and altogether ineffective in the case of certain other strip materials exhibiting at least one face coated with a metallic film.

In this latter instance, in fact, the metallic coating completely prevents the passage of a beam of light through the material and the measuring element does no more than verify the presence or absence of the strip.

Accordingly, the object of the present invention is to provide a sensing device capable of operating effectively particularly with a strip material having at least one face metallized.

SUMMARY OF THE INVENTION

The stated object is duly realized in a device for sensing the thickness of strip material according to the invention, designed in particular to operate in a station at which rolls of a metallized strip material are changed automatically.

The device essentially comprises a resonant circuit driven at an frequency of constant value, disposed and operating in conjunction with the metallized strip material, of which the reactance value is variable according to the electrical and physical properties and the thickness of the metallized strip material; also voltage sensing or measuring means of which the input and output are connected respectively to the resonant circuit and to the inputs of adjustable comparator means connected in their turn to corresponding output signal detection means.

BRIEF DESCRIPTION OF THE DRAWINGS

The invention will now be described in detail, by way of example, with the aid of the accompanying drawings, in which:

FIG. 1 is a block diagram of the device according to the present invention;

FIG. 2a is a schematic representation of the active element in the device of FIG. 1;

FIG. 2b is a symbolic diagram showing a resonant circuit and a comparator indicated schematically in FIGS. 1,2a and 2b;

FIGS. 3a and 3b are respective graphs illustrating resonance curves related to frequency and voltage, and the corresponding voltages at the terminals of the resonant circuit in the device disclosed.

DESCRIPTION of the PREFERRED EMBODIMENTS

In FIGS. 1, 2a and 2b of the drawings, numeral 1 denotes a device according to the invention, in its entirety, for sensing the thickness of strip material. The device in question is designed in particular for use with strip materials 2 consisting of paper having at least one face presenting a coating of metallic film, and generally used in conjunction with devices for changing rolls of such strip material automatically, and has as its essential component an inductor or coil 14. It will be appropriate at this juncture to recall that the term "inductor" defines a circuit element possessing inductance, which is utilized primarily by reason of this same property. The component in question, more commonly referred to as a coil, is strictly equivalent to an electromagnetic circuit in which lines of magnetic induction produced by a current-carrying electrical circuit, consisting in a plurality of appropriately arranged spiral turns, are disposed in such a way as to act on a magnetic circuit. The structure of the magnetic circuit is referred to conventionally as a core, whilst the electrical circuit consists in a coiled conductor encompassing the core and is known in electrical engineering as a solenoid.

Comparing FIGS. 1, 2a and 2b, with the foregoing premise in mind, the coil 14 comprises a magnetic circuit, embodied in the example illustrated as a toroidal core 3, and a solenoid 5 wound around the core 3. The core 3 of the coil 14 presents an opening or gap 4 through which the strip material 2 is made to pass in a direction normal to the viewing plane of FIGS. 2a and 2b (wherein the metallized strip 2 is indicated schematically by an elongated plain rectangle, with no distinction made between the paper support and the diamagnetic metallic film). As discernible from FIGS. 2a and 2b, the strip material 2 is supported by and directed forward between two parallel and mutually opposed C-profiled guides 15, drawn by feed means of conventional type not illustrated. The coil 14 is positioned with the gap 4 located between the parallel guides 15, as shown in FIGS. 2a and 2b, such that the strip material 2 must necessarily pass through the opening afforded by the core 3.

Numeral 7 denotes a capacitor (see FIGS. 2a and 2b) wired in series and combining with the coil 14 to form an inductive-capacitive circuit (L-C).

At certain particular values of frequency, or, in the solution to which the disclosure specifically relates, at certain particular values assigned to the reactive elements of the circuit described thus far (which has inductance and capacitance), the phenomenon of resonance will necessarily occur. Resonance is that particular condition existing in an oscillatory circuit when the frequency of the current coincides with that of the voltage, that is to say, the particular operating condition in which the equivalent impedance of the circuit is at zero magnitude. Resonance thus depends on inductance, capacitance and frequency, and there is only one resonant frequency Fr for any given pair of L and C values.

Accordingly, the inductive-capacitive L-C circuit described above is a resonant circuit 8 having a precise resonant frequency Fr. The circuit 8 in question is driven by a power source 6 delivering alternating current of a frequency F dissimilar to, and in the case of the solution illustrated by way of example, greater than the resonant frequency Fr of the resonant circuit 8.

The power source 6 comprises an oscillator 16 (see FIG. 1) capable of generating current at a frequency other than that of the resonant circuit 8, and an amplifier 17 capable of increasing the value of the current generated by the oscillator 16. In effect, if the frequency F generated by the oscillator 16 has a constant value of 50 KHz, by way of example (though any other given value of frequency F might be used), the resonant circuit 8 will be calibrated by setting the values of the two reactances L and C to give a resonant frequency Fr dissimilar to the frequency F generated by the oscillator 16. More exactly, the values L and C will be set to give a resonant frequency Fr less than the output frequency F of the oscillator 16, as illustrated in FIG. 3a.

The resonant circuit 8 embodied and driven in the manner described above can thus be manipulated, and in particular the inductance L of the circuit, to which a linear variation can be applied (as will be seen in due course) in such a way as to produce a corresponding variation in the value of the voltage registering at the terminals of the coil 14. The device 1 further comprises voltage sensing or measuring means 9 having an input therefore connected to the terminals of the coil 14 and an output connected to comparator means 10 and 11 capable of activating respective output signal detection means 12 and 13 performing a function that will be described in due course. The voltage sensing means 9 also perform the function of a rectifier, as will be made clear. The graph of FIG. 3a, where the 'x' axis indicates frequency f and the 'y' axis voltage $V_L$ (the value of which being dependent naturally on the current absorbed by the coil), shows the resonance curve of the circuit, and in particular the resonance curves produced by different resonant frequencies Fr. As readily discernible from FIG. 3a, where the value of the output frequency F from the oscillator 16 is constant, a variation in the value of the inductive reactance offered by the coil 14 produces a change in resonant frequency, and, therefore, a change in the position of the value Fr along the 'x' axis. More exactly, a lower inductance L causes Fr to increase and move nearer to the power supply frequency, with a higher inductance producing the opposite effect. The graph of FIG. 3a shows three different resonance curves denoted C0, C1 and C2 corresponding to three different values of inductance L at the coil 14. The curve denoted C0 refers to a value of inductive reactance L offered by the coil 14 with no strip material 2 occupying the gap 4, i.e. with the coil reacting to air only; the corresponding frequency is denoted FrO. With a layer of strip material 2 occupying the gap 4, and in the case in point, a material exhibiting at least one face coated with a diamagnetic metallic film, a measure of resistance is offered to the magnetic flux passing through the coil 14, or more exactly through the core 3, with the result that the inductance of the coil altered. In practice, the resistance offered to the flux by the strip of diamagnetic metallized material 2 is proportional to the thickness of the strip material itself, and occasions a lower value of magnetic flux, which is accompanied by a reduction in total permeability and therefore in inductive reactance L of the coil 14. Accordingly, these changes result in a higher resonant frequency Fr1 of the resonant circuit 8 and, given that the frequency applied to the resonant circuit 8 is constant and identical to the value F generated by the oscillator 16, a shift in the position of the resonance curve in FIG. 3a, which moves from C0 to C1 farther from the point of origin of the graph. If a double thickness of the diamagnetic metallized strip material 2 is inserted into the gap 4 afforded by the coil 14, the effect will be to offer a still greater resistance to the magnetic flux passing through the toroidal core 3, further reducing the inductance L of the coil 14 and giving rise to a third curve C2 (see FIG. 3a), coinciding with an even higher value of resonant frequency Fr2 in the resonant circuit 8 and placed still farther from the point of origin of the graph than the second curve C1.

Thus, the principle underlying the operation of the device 1 is one of monitoring the magnetic flux in the coil 14 and sensing any variation occasioned by an increased thickness of the metallized strip 2.

As discernible from FIG. 3a, lines drawn parallel to the 'x' axis, intersecting the three curves C0, C1, C2 at the value of the power supply frequency F, will coincide with three dissimilar voltages at the terminals of the coil 14: a first value V0 reflects the condition in which the gap 4 of the coil 14 is not occupied by any strip material 2, a second and higher value V1 reflects the condition in which the gap 4 of the coil 14 is occupied by one layer only of strip material 2, and a third value V2, higher still, the condition in which the gap 4 is occupied by a double thickness, or two layers of the strip material 2. In a second graph (FIG. 3b) of which the 'x' axis shows time t and the 'y' axis again shows the voltage $V_L$ at the terminals of the coil 14, an observation of the sinusoidal waveform exhibited by the voltage will reveal three different values of amplitude corresponding to the values V0, V1 and V2 mentioned above.

The voltage $V_L$ which registers at the terminals of the resonant circuit 8 is measured by the sensing means 9, and a corresponding output signal supplied by the latter to the comparator means 10 and 11, each of which is calibrated to a respective value. Observing FIGS. 1 and 2a, it will be seen that the voltage sensing means 9 comprise a diode 9a, by which the voltage is rectified to positive values, and a capacitor 9b serving to smooth the rectified voltage $V_L$.

Given that the frequency F of the current generated by the oscillator 16 is constant, the comparator means 10 and 11 are calibrated respectively to a voltage value between V0 and V1, corresponding to the frequencies F on the first two curves C0 and C1, and to a value between V1 and V2, corresponding to the frequencies F on the second two curves C1 and C2. The settings adopted for the comparator means 10 and 11 naturally will also depend on the type of strip material 2 handled, since the voltage values V1 and V2 depend likewise on the type of strip material 2. The calibration can be effected by conventional means, typically trimmers to which the comparators are wired, or automatically, in a manner obvious to persons skilled in the art. The signal detection means 12 and 13 activated by the comparator means 10 and 11, respectively, might be of any given type, for example optical, acoustic or even electric, such as electrical switches wired to activate or deactivate corresponding gates of a central processing unit monitoring and controlling the operation of the entire roll-change device. To ensure the effectiveness of the device 1, an output signal will be supplied by one comparator means 10 to the relative detection means 12 on receipt of an input voltage not less than its own setting, whilst the other comparator means 11 will supply a signal to the relative detection means 13 on receipt of an input voltage higher than its own setting.

With the device 1 according to the invention in a normal operating situation, that is to say, with a single layer of strip material 2 advancing between the parallel guides 15, the resistance offered by the material to the magnetic flux generated through the coil 14 will be such that the voltage sensing means 9 respond to a voltage at the terminals of the coil 14 of which the value is between V1 and V2 (see FIG. 3b). In this situation, only the detection means denoted 12 will be activated by the relative comparator means 10.

In the event that the strip material 2 should break so that no resistance is offered any longer to the magnetic flux generated in the coil 14, neither of the output signal detection means 12 or 13 will be activated by the relative comparator means 10 and 11, indicating the absence of any strip material 2. Conversely, the moment the gap 4 in the coil 14 is occupied by a length of strip material 2 measuring twice the normal thickness, as the result of a joint being made between the trailing end of a depleting roll of the strip material and the leading end of a replacement roll, the resistance offered to the magnetic flux generated in the coil 14 increases significantly to a value above the setting of the comparator means 11 with the higher calibration. Accordingly, the respective detection means 13 are activated to indicate the passage of a double thickness of strip through the coil 14. This same signal might be relayed to a central monitoring and control unit capable of piloting the operation of conventional means (not described) to discard a portion of the strip material including the stretch of double thickness identified by the device 1. The principal advantage of the invention is that it achieves simplicity in construction and operation, with the result that the device is simple and safe to use. Moreover, the operation of a sensing device embodied and functioning in the manner disclosed remains unaffected by any flutter resulting from the positional drift that can occur in such strip materials when conveyed at high speed.

What is claimed:

1. A device for sensing the thickness of strip material for use in an apparatus in which rolls of metallized strip material are changed automatically comprising:

a resonant electrical circuit driven at an input frequency of constant value different from a resonant frequency of the circuit, said resonant electrical circuit including a capacitor connected in series with a coil assembly, said coil assembly including a solenoid wound on a toroidal core having a gap through which the metallized strip material is able to pass without contacting the core, said coil assembly producing an inductance varying based upon the thickness of said metallized strip material;

voltage sensing means for measuring a voltage at terminals of said coil, said voltage varying as a function of said inductance of said coil assembly;

comparator means for comparing the voltage measured by the sensing means with a predetermined voltage value, said sensing means having an input and output connected respectively with the resonant electrical circuit and with the comparator means; and output signal detection means connected with said comparator means to enable the detection means to indicate the thickness of said strip material based on the voltage measured by the voltage sensing means.

2. A sensing device as in claim 1, wherein the comparator means can be calibrated according to the type of strip material being used.

\* \* \* \* \*